United States Patent
Lenz et al.

(10) Patent No.: US 6,815,116 B2
(45) Date of Patent: Nov. 9, 2004

(54) FLEXIBLE INTERCONNECTS FOR FUEL CELL STACKS

(75) Inventors: David J. Lenz, Livermore, CA (US); Brandon W. Chung, Dublin, CA (US); Ai Quoc Pham, San Jose, CA (US)

(73) Assignee: The Regents of the University of California, Oakland, CA (US)

(*) Notice: Subject to any disclaimer, the term of this patent is extended or adjusted under 35 U.S.C. 154(b) by 125 days.

(21) Appl. No.: 09/960,695

(22) Filed: Sep. 21, 2001

(65) Prior Publication Data

US 2002/0127459 A1 Sep. 12, 2002

Related U.S. Application Data

(60) Provisional application No. 60/274,201, filed on Mar. 8, 2001.

(51) Int. Cl.[7] .................................................. H01M 2/14
(52) U.S. Cl. .............................. 429/38; 429/39; 429/32; 429/34
(58) Field of Search .............................. 429/38, 39, 32, 429/34

(56) References Cited

U.S. PATENT DOCUMENTS 4,983,472 A * 1/1991 Katz et al. .................... 429/38

* cited by examiner

*Primary Examiner*—Bruce F. Bell
(74) *Attorney, Agent, or Firm*—John P. Wooldridge; L. E. Carnahan; Alan H. Thompson

(57) ABSTRACT

An interconnect that facilitates electrical connection and mechanical support with minimal mechanical stress for fuel cell stacks. The interconnects are flexible and provide mechanically robust fuel cell stacks with higher stack performance at lower cost. The flexible interconnects replace the prior rigid rib interconnects with flexible "fingers" or contact pads which will accommodate the imperfect flatness of the ceramic fuel cells. Also, the mechanical stress of stacked fuel cells will be smaller due to the flexibility of the fingers. The interconnects can be one-sided or double-sided.

15 Claims, 4 Drawing Sheets

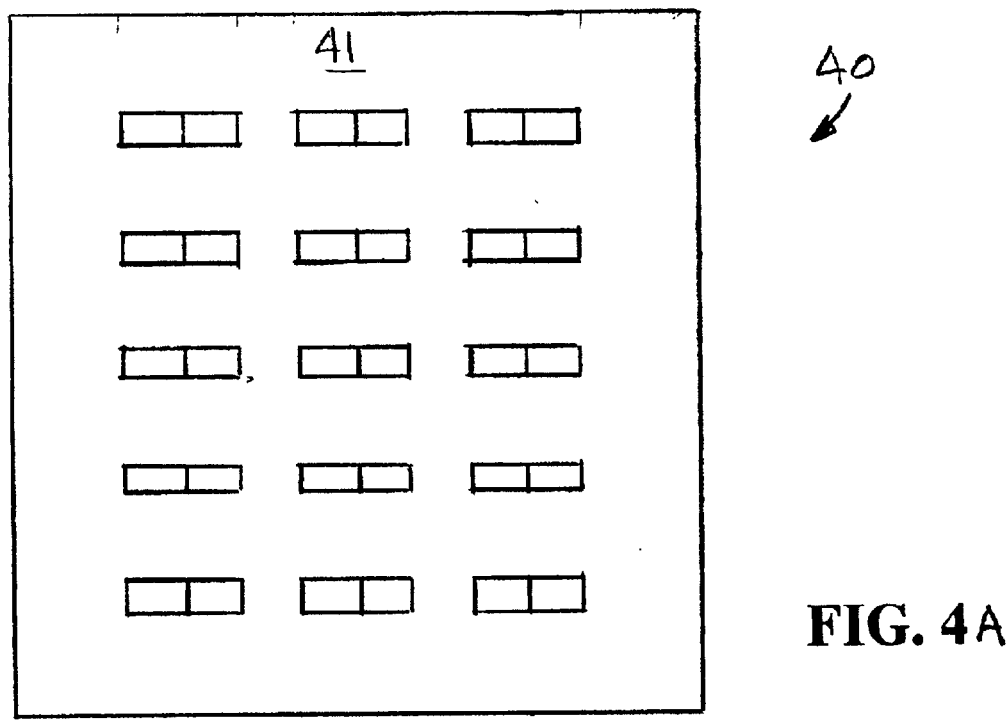
FIG. 4A
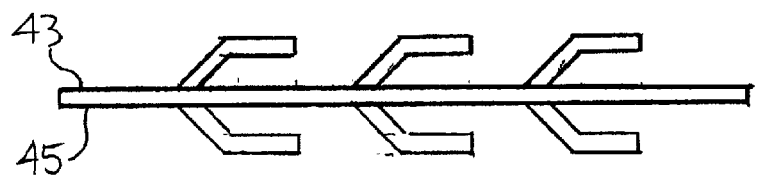
FIG. 4B
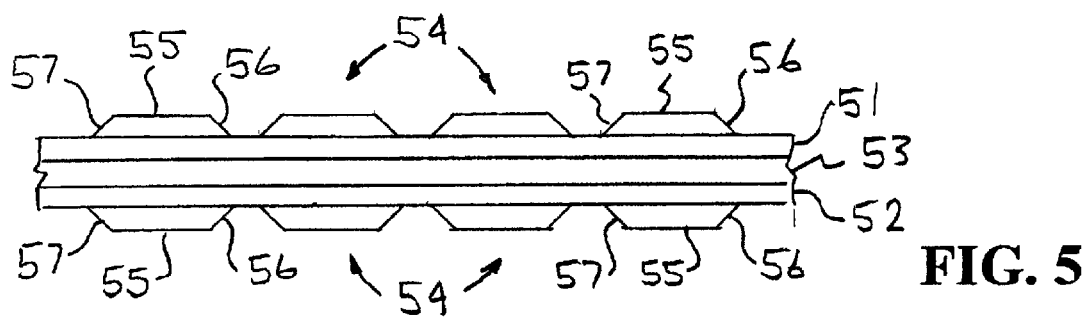
FIG. 5

FLEXIBLE INTERCONNECTS FOR FUEL CELL STACKS

RELATED APPLICATION

This application relates to U.S. Provisional Application No. 60/274,201 filed Mar. 8, 2001, and claims priority thereof under 35 USC 120.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to fuel cell interconnects, particularly to interconnects for fuel cell stacks, and more particular to flexible interconnects for fuel cell stacks which facilitates electrical connection and provides mechanical support with minimal mechanical stress.

Fuel cells are electrochemical devices that convert the chemical energy in fuels directly into electricity. Due to the thermodynamics of the reaction of the fuel and oxygen from air, single fuel cells have a voltage of about 1 volt. Thus, for practical applications, several cells must be stacked together to generate a higher voltage. The stacking of the cells require the use of an interconnect to electrically connect the cells. Most of the time, the interconnect also serves as the gas channels for the air and fuel flows. FIG. 1, described in detail herein after, shows an exploded view of a conventional fuel cell stack having a cross-flow design for the air and fuel.

In FIG. 1, the interconnect is made of an oxidation resistant alloy, and has spaced ribs that serve as the air and fuel channels. The structure is very similar to that of a heat exchanger. For good electrical contact, the interconnect must be in close physical contact with the single cells located on opposite sides. Due to the unavoidable slight curvature of the ceramic fuel cells, good contact over the entire cell difficult. In addition, the areas that are located below the ribs of the interconnect are not directly exposed to the gas and thus gas starvation could occur, leading to low stack efficiency. On the other had, interconnects with too thin ribs could have insufficient contact area with the cells. The stacking of metal interconnects with ceramic fuel cells can also cause high stress because of the rigidity of the structure and because of the difference in thermal behavior of metals and ceramics.

The present invention provides a solution to the above-reference problems associated with rigid ribs of the conventional interconnects, and provides in place of the rigid ribs, flexible "fingers" which will accommodate the imperfect flatness of the ceramic fuel cells. These flexible fingers enable improved electrical contact between cells and interconnects, and reduce the mechanical stress, as well as reducing areas subject to gas starvation.

SUMMARY OF THE INVENTION

It is an object of the present invention to provide fuel cell stacks with flexible interconnects.

A further object of the invention is to provide fuel cell interconnects that facilitates electrical connection and provides mechanical support with minimal mechanical stress.

Another object of the invention is to replace the rigid ribs of conventionally known fuel cell interconnects with interconnects having flexible fingers.

Another object of the invention is to provide fuel cell interconnections with flexible fingers which will accommodate any imperfect flatness of the fuel cells.

Another object of the invention is to provide interconnect plates having flexible fingers on both sides of the plate.

Another object of the invention is to provide interconnect plates wherein only the air side must be made of oxidation resistant material, and the fingers on the fuel side made of-flexible high conductivity material.

Another object of the invention is to provide back-to-back interconnect made from a single plate with fingers pointing up as well as down to form a common connection to two electrodes.

Other objects and advantages of the present invention will become apparent from the following description and the accompanying drawings. The present invention involves flexible interconnects for fuel cell stacks. The flexible member or fingers facilitates electrical connection, enables mechanical support with minimal mechanical stress, and the flexibility accommodates any imperfect flatness of the fuel cells, such as the ceramic cell. In addition, the area of the cell that is in contact with the fingers of the interconnect is smaller than the conventional rigid ribs and thus less gas starvation is provided. The interconnects can be made of three plates, for example, with a separator plate, a plate with flexible fingers or contact pads on the fuel side, and a plate with flexible fingers on the air side. Only the air side plate must be made of oxidation resistant material, while the fuel side plate can be made of flexible high conductivity material. Also, the interconnection can be fabrication in a back-to-back configuration from a single plate with flexible finger extending in opposite directions to form a common connection for two electrodes. The length and size of each flexible finger can be tailored to each individual application.

BRIEF DESCRIPTION OF DRAWINGS

The accompanying drawings, which are incorporated into and form a part of the disclosure, illustrate an embodiment of the invention and, together with the description, serve to explain the prinples of the invention.

FIGS. 4A and 4B illustrate a back-to-back flexible finger arrangement for interconnecting electrodes on opposite sides of the interconnect, with FIG. 4B being a side view of FIG. 4A.

FIG. 5 illustrates an embodiment of the invention utilizing a flexible bridge structure.

DETAILED DESCRIPTION OF THE INVENTION

The present invention involves flexible interconnects for fuel cell stacks. The interconnect of this invention facilitates electrical connection and mechanical support with minimal mechanical stress for fuel cell stacks. This leads to mechanically robust fuel cell stacks with higher stack performance at lower cost. The present invention replaces the rigid ribs of prior known interconnects with contact pads that can be in the form of flexible fingers or bridges. Due to the particular shape, and if an appropriate alloy is used, the fingers can have some flexibility which will accommodate the imperfect flatness of the ceramic fuel cells. This enables a significant improvement for the electrical contact between cells and interconnects. The mechanical stress will be smaller due to the flexibility of the fingers. In addition, the area of the single cells that is in contact with the interconnect can be large without causing any serious gas starvation because of the thinner "legs".

The interconnects of this invention utilizes plates which can actually be made of three layers with one separator plate or layer in the middle, one plate with fingers on the fuel side, and one plate with fingers on the air side. Only the plate on the air side must be made of an oxidation resistant alloy, such as Inconel 600 or 601, Hanes 230, and some ferritic stainless steel. The plate with the fingers on the fuel side can be made of the same materials on the air side, or flexible material or metal with high conductivity, such as copper, silver, and gold, without fear of oxidation. The separate plate can be made of the same materials as on the air side. The thickness can be made thicker in order to serve as mechanical support to the entire structure.

In a back-to-back configuration, the fingers can be made from one plate, with the fingers pointed up as well as down to form a common connection to two electrodes. Length and size of each finger can be tailored to each individual application with a minimum of expenditure for forming tooling. The any one plate can be provided with fingers of varying length and/or width, as well as being made form various materials depending on the intended application.

Figure 1:
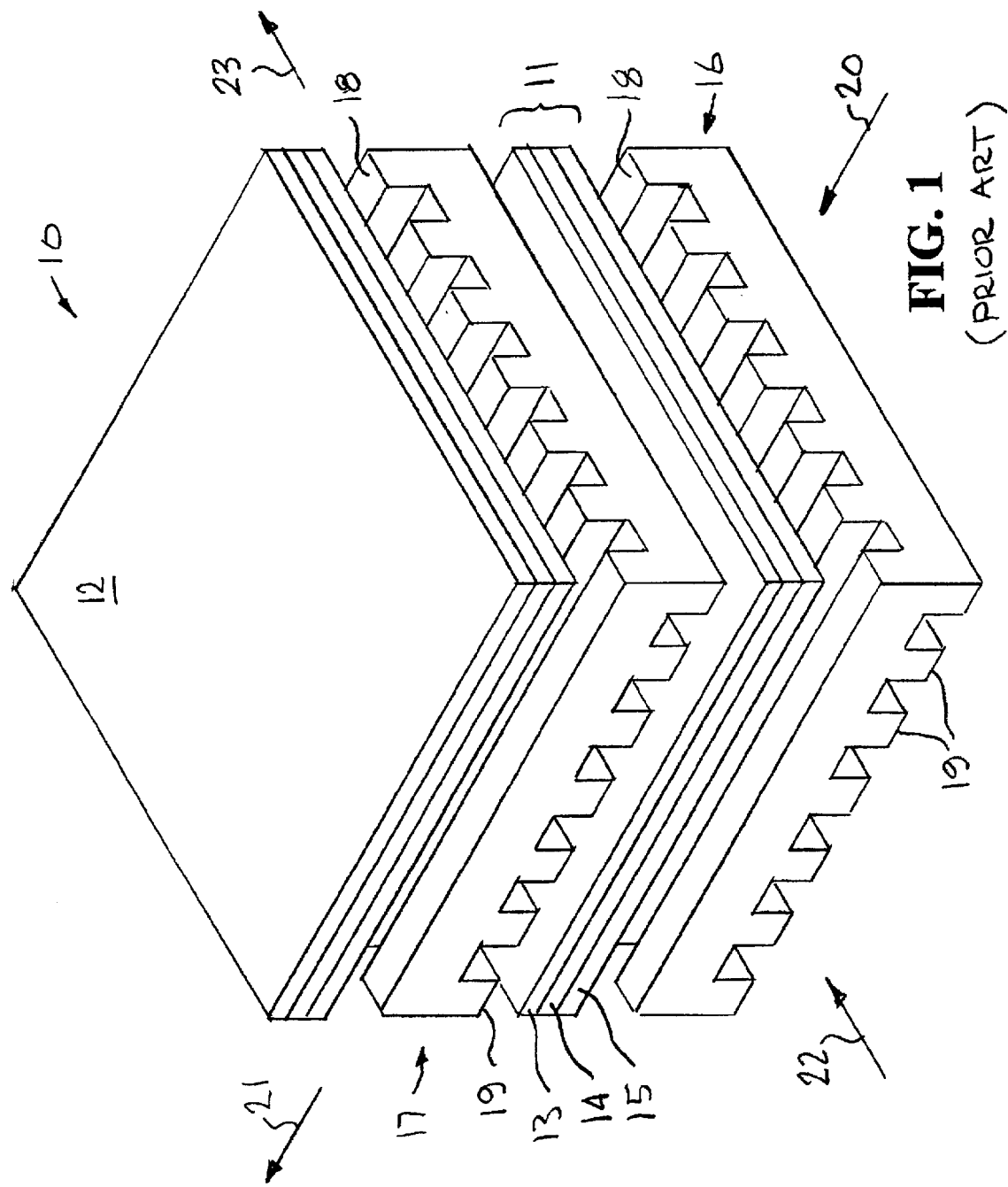
FIG. 1 illustrates a fuel cell stack with the prior art rigid rib interconnects.

Referring now to the drawings, FIG. 1 illustrate a fuel cell stack utilizing prior art interconnectors having rigid ribs, while FIGS. 2A–2B, 3A–3B, and 4A–4B illustrate embodiments of interconnects made in accordance with the present invention using flexible fingers.

As seen in FIG. 1, a fuel cell stack generally indicated at 10, includes two ceramic single cells 11 and 12, each single cell including an anode 13, and electrolyte 14, and a cathode 15, with an interconnector 16 located beneath fuel cell 11 and an interconnector 17 located intermediate fuel cells 11 and 12. Each interconnector 16 and 17 include a series of rigid ribs 18 and 19 on opposite side thereof, with ribs 19 extending perpendicular to ribs 18, whereby air passes through the areas between ribs 18 and fuel passes through the areas between ribs 19, as indicated by arrows 20–21 and arrows 22–23, respectively.

Figure 2A:
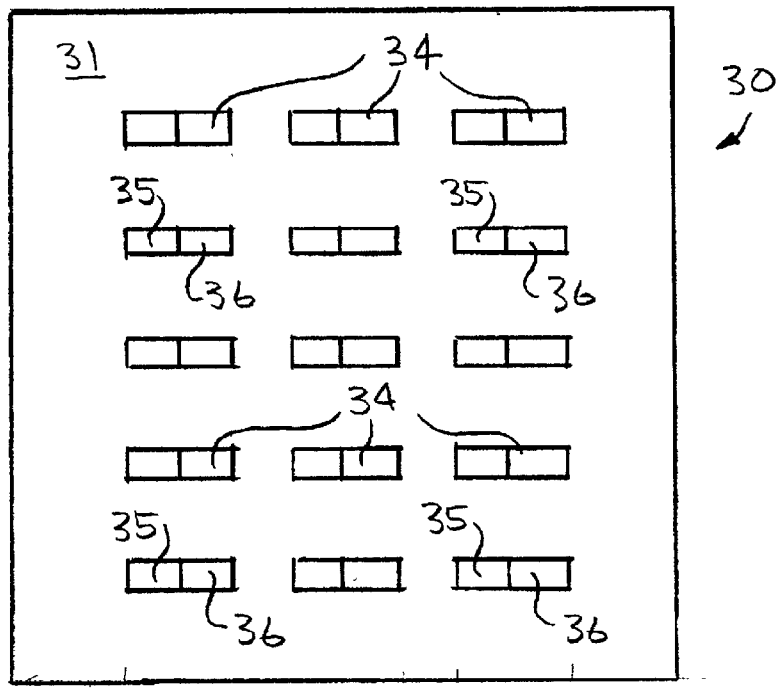
FIGS. 2A and 2B illustrate an embodiment of the present invention utilizing short flexible fingers, with FIG. 2B being a side exploded view of FIG. 2A.
Figure 2B:
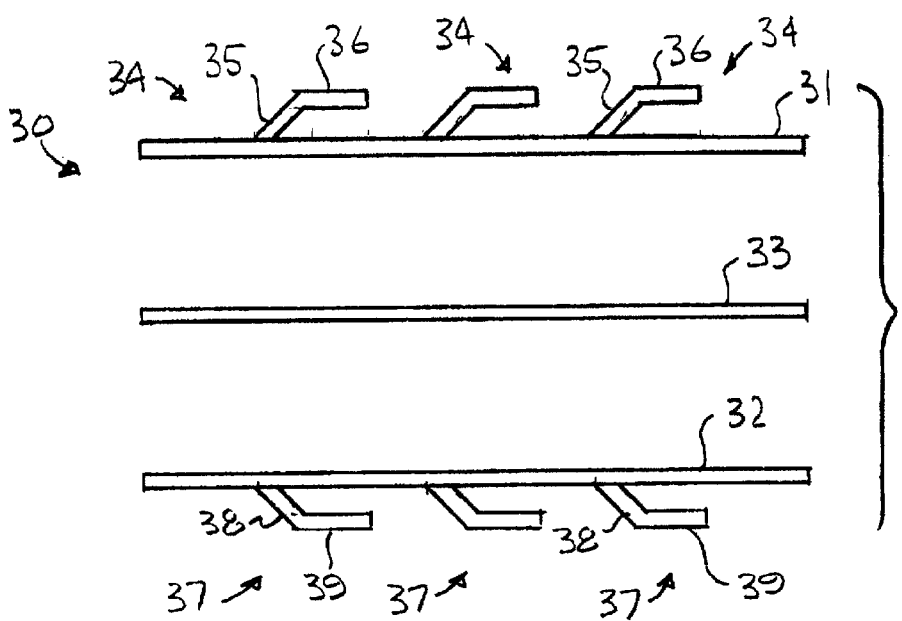

FIGS. 2A–2B illustrate a three plate embodiment of an interconnect of the invention generally indicated at 30 and including outer plates 31 and 32 with a separator plate 33 therebetween, as seen in the exploded side view of FIG. 2B. The upper outer plate 31 is provided with a plurality of outwardly projecting fingers or contact pads 34, each having a tapered section 35 and flat or straight section 36, and are formed by a punching process of plate 31 without removing material from the plate, as known in the art. Similarly lower outer plate 32 is provided with projecting fingers or contact pads 37 having a tapered second 38 and flat or straight section 39. As pointed out above, only the air side of the interconnect 30 (plate 31 or 32) must be made of or coated with oxidation resistant material, with separator plate 33 being composed of the same material such as for the air side.

By way of example, the fingers 34 and 37 of plates 31 and 32 may have a overall length of 6 to 15 mm and a width of 4 to 10 mm, thickness of 1 to 20 $\mu$m preferably 5 to 10 $\mu$m, with the tapered sections being at an angle of 30° to 80° with a length of 2 to 10 mm, and the flat sections having a length of 4 to 10 mm. The separator plate 33 may have a thickness of 10 to 200 $\mu$m, preferably 20 to 50 $\mu$m. As pointed out above, the fingers 37 of plate 32 may be of different sizes or shapes than fingers 34 of plate 31, or the various fingers on either plate may be of different sizes and shapes to accommodate various applications. Because of thermal expansion compatibility and simplicity, one may desire to utilize the same material for all layers. Also, the difference in fuel and air flows may require different spacings.

Figure 3A:
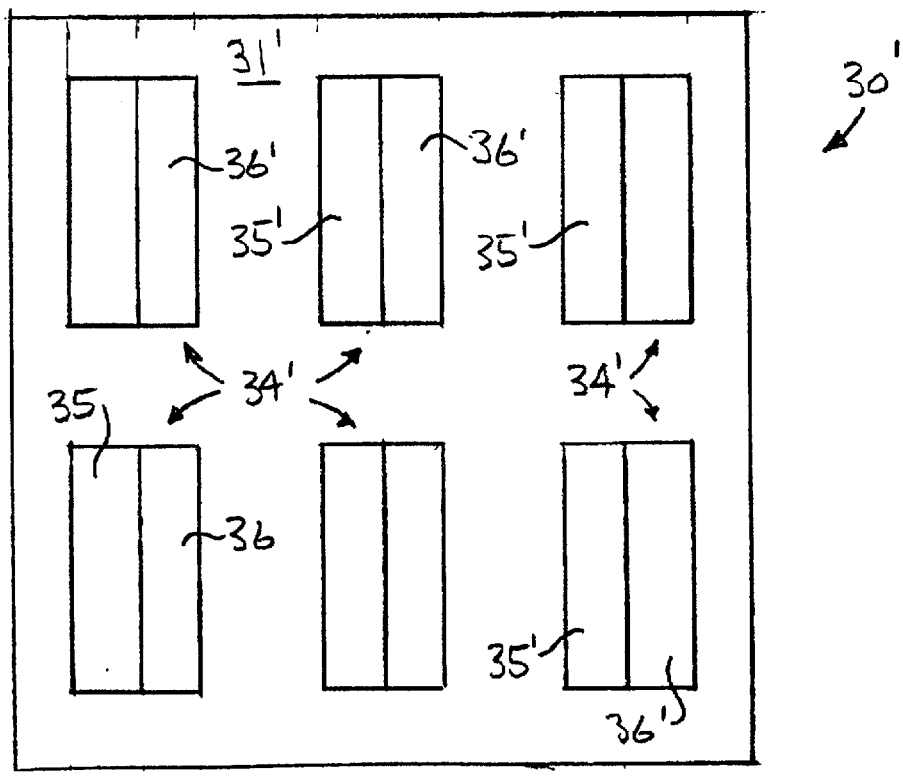
FIGS. 3A and 3B illustrate an embodiment of the invention utilizing longer length flexible fingers, FIG. 3B being a side exploded view of FIG. 3A.
Figure 3B:
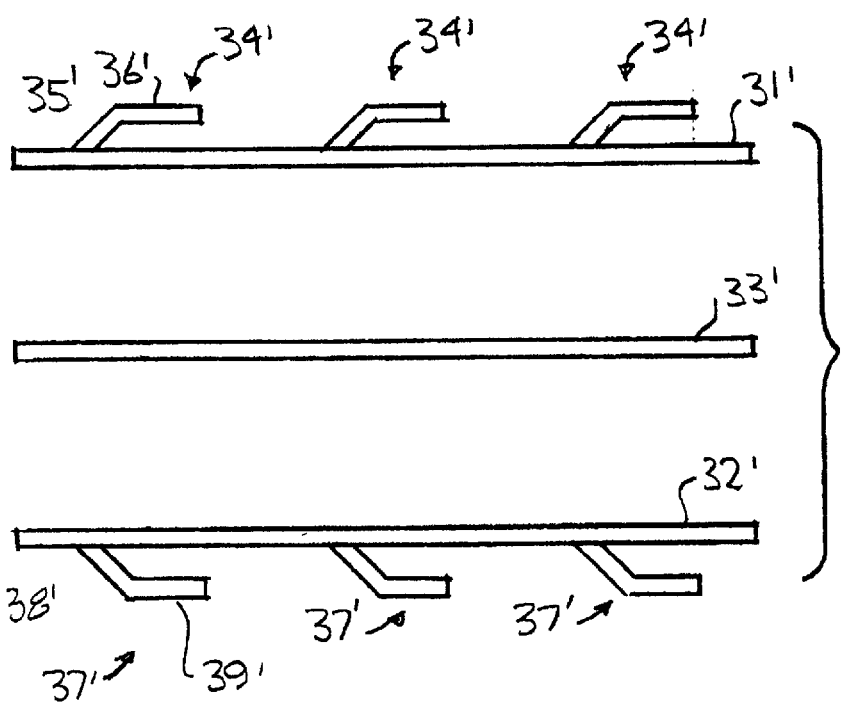

The embodiment of FIG. 3A and 3B differs from that of FIGS. 2A–2B in the difference in size of the fingers or contact pads, and corresponding components are provided with corresponding reference numerals. As seen in FIG. 3A, the fingers or contact pads $34^1$ have a substantially greater width that those of FIG. 2A, with only six (6) fingers $34^1$ shown of plate 31, and wherein the tapered sections, $35^1$ and flat sections $35^1$ (see FIG. 3B) having widths of 6 to 15 mm, and may have similar angles and lengths as described above. Similarly, plate $32^1$ may be provided with fingers $37^1$ constructed as shown in FIG. 3A.

The FIGS. 4A–4B embodiment generally indicated at 40 comprises a single plate 41 having fingers or contact pads 42 extending from an upper surface 43 and fingers or contact pads 44 extending from a lower surface 45, with the fingers in the upper surface offset from those in the lower surfaces. As in FIGS. 2A–2B the fingers 42 include a tapered section 46 and a flat or straight section 47, while the fingers 44 include tapered and flat sections 48 and 49. The lengths, widths, and angles of fingers 42 and 44 may be made as described above. FIG. 5 illustrates a cross-section of another embodiment of the invention which utilizes a bridge structure rather than fingers, and involves two legs instead of 1. As shown, a three layer structure indicated at 50 includes outer plates 51 and 52 with a separator plate 53 therebetween, as in the FIGS. 2A–2B embodiment. Each of the outer plates 51 and 53 is provided with outwardly extending bridges or members 54, having a flat or face section 55 and a pair of leg sections 56 and 57. As in FIGS. 2A–2B, the bridges 54 may be punched out of the plates 51 and 52. Also, the bridges 54 can be formed from two facing fingers with the outer ends of the flat section of the fingers bonded or brazed together.

While the three layer structure may be made by various methods, the preferred methods are by brazing or diffusion bonding of the plates.

It has thus been shown that the present invention provides interconnects for cell stacks which overcome the problems of the prior art interconnect. The interconnects of this invention replace the prior know rigid ribs with flexible fingers or contact pads, which may be sized for various applications. These flexible interconnects can also be used in other devices, such as: steam electrolyzers, ceramic oxygen generators, ceramic hydrogen generators, $CO_2$ electrolyzers, etc.

While particular embodiments of the invention have been illustrated, along with particular parameters and materials, to exemplify and teach the principles of the invention, such are not intended to be limiting. Modifications and changes may become apparent to those skilled in the art, and it is intended that the invention be limited only by the scope of the appended claims.

What is claimed is:

1. A flexible interconnect for fuel cells comprising:
    a three layer plate, wherein each layer of said three layer plate comprises a different material; and
    a plurality of spaced members extending outwardly from at least one surface of said plate, said members including a section defining contact pads.

2. The flexible interconnect of claim 1, additionally including a plurality of spaced members extending outwardly from opposite sides of said plate.

3. The flexible interconnect of claim 1, wherein at least one layer of said three layer plate includes an oxidation resistant material.

4. The flexible interconnect of claim 1, wherein at least one layer of said three layer plate includes a high conductivity material.

5. The flexible interconnect of claim 1, wherein a first layer of said three layer plate is composed of an oxidation resistant material, wherein a second layer of said three layer plate is composed of a high conductivity material, and a third layer of said three layer plate is composed of material located intermediate said first layer and said second layer.

6. The flexible interconnect of claim 1, wherein each of said plurality of spaced members has an end integral with said plate.

7. A flexible interconnect for fuel cells comprising:

a three layer plate, wherein each layer of said three layer plate comprises a different material; and a plurality of spaced members extending outwardly from at least one surface of said plate, said members including a section defining contact pads, wherein each of said plurality of spaced members is composed of a plurality of sections, at least a first section extending at an angle with respect to said plate, and a second being substantially parallel to said plate, wherein said spaced members are constructed from the group consisting of fingers and bridges.

8. The flexible interconnect of claim 7, wherein at least said first section has a portion integral with said plate.

9. The flexible interconnect of claim 7, wherein said plurality of spaced members each have a width greater than a length thereof.

10. The flexible interconnect of claim 7, wherein said plurality of spaced members each have a length greater than a width thereof.

11. The flexible interconnect of claim 7, wherein at least one of said plurality of spaced members has dimensions different from dimensions of at least another of said spaced members.

12. The flexible interconnect of claim 7, wherein said plurality of spaced members are mounted intermediate a pair of single cells, wherein said plurality of flexible members extend from opposite sides of said plate so as to be in contact with an anode of one fuel cell and a cathode of an adjacent cell.

13. A flexible interconnect for fuel cells comprising:

a three layer plate, wherein each layer of said three layer plate comprises a different material; and a plurality of spaced members extending outwardly from at least one surface of said plate, said members including a section defining contact pads, wherein said plurality of spaced members are constructed to form one of a finger having a tapered section and a flat section or a bridge having a flat section and two tapered sections.

14. A fuel cell stack, comprising:

a plurality of single cells, a plurality of interconnects, with at least an interconnect located intermediate adjacent single cells, said plurality of interconnects having spaced protruding members which contact opposite surfaces of adjacent single cells, wherein said plurality of interconnects are of a configuration having at least one tapering section and one flat section.

15. The fuel cell stack of claim 14, wherein said plurality of interconnects are of a bridge configuration.

* * * * *